Nov. 28, 1950 A. ELLETT 2,531,974

SUBSCRIPTION TYPE TELEVISION TRANSMITTER

Filed April 7, 1949 3 Sheets-Sheet 1

ALEXANDER ELLETT
INVENTOR.

BY Bruce Bischof

HIS AGENT

Nov. 28, 1950 A. ELLETT 2,531,974

SUBSCRIPTION TYPE TELEVISION TRANSMITTER

Filed April 7, 1949 3 Sheets-Sheet 2

ALEXANDER ELLETT
*INVENTOR.*

BY [signature]

HIS AGENT

SUBSCRIPTION TYPE TELEVISION TRANSMITTER

Filed April 7, 1949 3 Sheets-Sheet 3

ALEXANDER ELLETT
*INVENTOR.*
BY [signature]
HIS AGENT

Patented Nov. 28, 1950 2,531,974

UNITED STATES PATENT OFFICE 2,531,974

SUBSCRIPTION TYPE TELEVISION TRANSMITTER

Alexander Ellett, River Forest, Ill., assignor to Zenith Radio Corporation, a corporation of Illinois Application April 7, 1949, Serial No. 85,963

8 Claims. (Cl. 178—5.1)

The present invention relates, in general, to a subscription type television transmitter and is particularly directed to such a transmitter for deriving program information from a continuous and conventional film strip. The expression "subscription type television transmitter," as used herein, is intended to define a transmitter for radiating a coded or scrambled television signal that is not susceptible to intelligible image reproduction by conventional receivers unless such receivers are controlled in accordance with a decoding schedule corresponding to the coding schedule employed at the transmitter.

Subscription type television systems generally similar to that to be described are disclosed and claimed in copending application Serial Number 742,374, filed on April 18, 1947, in the name of Alexander Ellett, et al., now issued as Patent No. 2,510,046, dated May 30, 1950, and copending application Serial Number 773,848, filed September 13, 1947, in the name of Erwin M. Roschke, both of which are assigned to the same assignee as the present invention. In the systems featured in those applications, coding of the transmitted signal is accomplished by altering, during spaced operating intervals, some operating characteristic of the transmitter which is manifest in the composite radiated signal. For example, by periodically injecting a delay between the line-trace interval of the video-frequency signal generator and the horizontal-synchronizing-signal components, the relation of the video- and horizontal-synchronizing portions of the radiating signal may be changed from time to time from the relation normally established in commercial television transmission. Similarly, periodic reversal of the direction of either the horizontal or vertical trace in the video-frequency generator causes the composition of the radiated signal to deviate from its usual form. Obviously, a conventional receiver responding to such a scrambled or coded transmission produces a picture that is both unintelligible and very uncomfortable to an observer unless compensating variations are introduced into the operation of the receiver to decode the received signal.

While there are several methods for exercizing control of the receiver in order to accomplish decoding, a relatively simple method may be practiced by including in the receiver a coding arrangement generally similar to that utilized at the transmitter and by controlling the coding arrangement in accordance with a key signal supplied to the receiver from the transmitter by way of a line circuit, such as an ordinary telephone line. The key signal supplied to the receiver has amplitude variations or other characteristic variations which represent the coding schedule employed at the transmitter and which may, therefore, initiate a compensating coding function at the receiver to permit intelligent use of the received signal even though it is coded. Moreover, the use of the line circuit enables a selective dissemination of the key signal so that the radiated program information is used exclusively by those receivers which have subscribed to the program service.

Another form of subscription television transmission is the subject of copending application Serial Number 82,029, filed March 23, 1949, in the name of Alexander Ellett, and likewise assigned to the same assignee as the present invention. In that system, coding of the transmitted television signal is accomplished through the use of a film in which the program information is recorded in accordance with a preselected coding schedule. The major electrical components of the transmitter itself, however, function in their usual and conventional way but the scanning of a coded film introduces the privacy aspects to the system.

The present invention is concerned with still a different form of subscription television transmission in which the usual electrical components of the transmitter function in their ordinary way and scan a conventional film but, nevertheless, coding is effected through the use of an optical system of such construction that the film scanner produces a coded television signal analogous to that obtained by scanning a coded film strip.

It is an object of the present invention to provide a novel subscription type television transmitter for deriving coded television signals from a conventional film strip.

It is another object of the invention to provide a television transmitter of the film scanning type having a novel optical system controlled in a unique manner to facilitate the derivation of coded television signals by scanning an uncoded film strip.

A subscription television transmitter, in accordance with the instant invention, is adapted to derive coded television signals from a film strip on which program information is recorded in the same mode in succeeding frames. The transmitter comprises a video-frequency signal generator, including means for scanning an image, and an optical system for presenting images of successive frames of the film to the scanning means. The optical system includes a coding means or device (such as a displaceable refractory optical plate) for changing the mode of images presented to the scanner. An actuating means is provided for displacing the coding element to vary, during spaced operating intervals, the modes of images presented by the optical system to the scanner. There is a synchronizing-signal generator for producing synchronizing signals representing the scanning cycles of the film scanner and a mixer amplifier is coupled to the video-frequency signal generator and to the synchronizing-signal generator to develop a coded composite television signal including video-frequency as well as synchronizing-signal components. The coded television signal is transmitted to subscriber receivers over a first signal channel, such as an ether link. The transmitter further includes a key-signal generator and means for controlling that generator to produce a key signal having characteristic variations, which may take the form of amplitude variations, representing the changes in mode of images presented to the film scanner by the optical system. Finally, means are provided for supplying the key signal to a second signal channel for transmission to subscriber receivers. The last-mentioned channel may conveniently be a telephone line or other line circuit extending from the transmitter to the subscriber receivers.

In the foregoing statement, the subscription television transmitter is characterized as deriving coded television signals from a film strip on which program information is recorded in the same mode in succeeding frames. The expression, "recorded in the same mode in succeeding frames" is intended to describe the conventional method of film recording in which any given point of a particular subject occupies the identical position in succeeding frames and has in each frame the same shade value, assuming that there is no modification of the subject as between the several frames which are compared. The transmitter is further characterized as including coding means for changing the mode of images presented to the film scanner. A full understanding of the expression, "changing the mode of images presented to the film scanner" may be derived from the following description of particular embodiments of the invention. By way of introduction, however, an optical system which projects images of film frames on a film scanner without introducing any material variation of the image from frame to frame may be considered as one that invariably presents the frame images in the same mode to the film scanner. The inclusion of any element in the optical system which may, from time to time, occasion a variation in the presentation of the frame image to the film scanner may then be considered as one that effects a change in mode in the image presentation.

More specifically, a refracting element periodically placed across the optical path in a non-perpendicular relation with respect thereto causes the position of a frame image to shift either vertically or laterally on the scanning area of the film scanner. Likewise, by inserting other optical components, it is possible to have the frame image inverted from top to bottom or from left to right as observed on the scanned area of the film scanner. In any case where there has been a displacement of the frame image relative to the scanning area or an inversion of the image or any other variation of the frame image, the mode of presenting the image to the film scanner has, for the purpose of this description and within the intendment of the appended claims, experienced a change. Since the operation of the film scanner per se, is not modified, any such change in mode accomplishes coding because the film scanner traverses its target or scanned area in a fixed pattern from frame to frame. Consequently, a variation of the mode of information presented to the scanned area necessarily results in the derivation of a coded television signal through the scanning operation.

For a better understanding of the present invention together with other and further objects thereof, reference is had to the following description taken in connection with the accompanying drawings and its scope will be pointed out in the appended claims. In the drawings:

Figure 1:
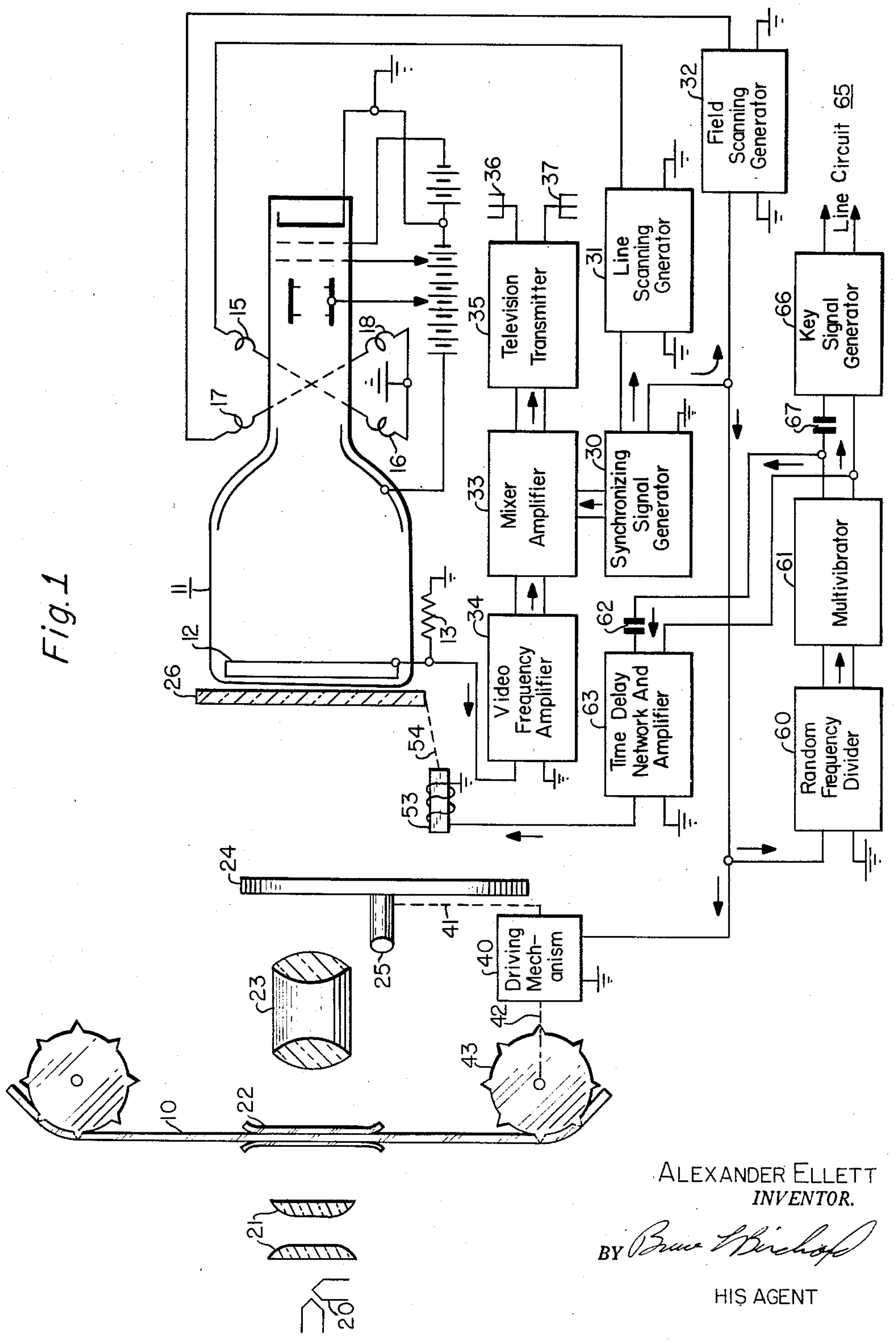
Fig. 1 is a schematic representation of a subscription type television transmitter embodying the present invention in one form.

Referring now more particularly to Fig. 1, the arrangement there illustrated is a subscription type television transmitter for deriving coded television signals from a film strip 10 on which program information is recorded in the same mode in succeeding frames. The transmitter comprises a video-frequency signal generator 11 including means for scanning an image. It may be of any well known design and construction because the principles of this invention are aplicable to mechanical type film scanners, so-called flying-spot scanners, or any of the known forms of electronic scanners whether they be of the storing or non-storing type or utilize high or low velocity electron beams. For convenience of explanation, it may be assumed that the generator 11 is of the low-velocity image-storing type, such as that commercially referred to as an "orthicon."

Generator 11 comprises the customary electrode system for producing, accelerating and focussing a beam of low-velocity electrons with respect to a target electrode 12, more generally referred to as the mosaic, the electrode system and the mosaic being enclosed within an evacuated envelope. The generator has a load impedance 13 across which video-frequency signal potentials are developed in response to the scanning of the mosaic 12. In order to accomplish scanning of the mosaic, the tube has beam-deflecting elements which may be of the electrostatic or electromagnetic type, although the latter have been represented and comprise line-scanning windings 15, 16 and field-scanning windings 17, 18.

An optical system is associated with the generator 11 to present images of successive frames of the film 10 to the mosaic 12 for scanning by the electron beam. The optical system, as shown, includes a light source 20 and condenser lenses 21, 21 for directing a beam of light to a film gate 22 through which the film 10 is driven. Light transmitted through the film gate is projected by a further lens 23 to the mosaic 12 of tube 11. A conventional flashing shutter 24 is supported upon a rotatable shaft 25 and positioned to intersect the optical path defined by the aforedescribed optical system to block the light to the mosaic 12 periodically. Additionally, a coding means or element 26 is included within the optical path for a purpose to be explained fully hereinafter.

The transmitter further includes a synchronizing-signal generator 30 for timing the scanning cycles of the electron beam of the generator 11 and for producing synchronizing signals representing such scanning cycles. Appropriate output terminals of the synchronizing-signal generator are coupled to the input terminals of a line-scanning generator 31 and a field-scanning generator 32, the output circuits of which are directly connected with the line-scanning windings 15, 16 and the field-scanning windings 17, 18, respectively.

A mixer amplifier 33 has one input circuit connected to the load impedance 13 of the generator 11 through a video-frequency amplifier 34 of any desired number of stages and has another input circuit directly connected to synchronizing-signal generator 30. The mixer amplifier, through the process of combining video-frequency components derived from the generator 11 and synchronizing-signal components obtained from the generator 30, produces a composite television signal and its output circuit is connected to the input circuit of a television transmitter 35 including a carrier wave signal supply and a modulator. The output terminals of the transmitter 35 connect with an antenna system 36, 37 constituting means for transmitting the composite signal to subscriber receivers over a first signal channel, namely, an ether link.

A driving mechanism 40 is provided and is mechanically coupled, as represented by the dash-dot lines 41 and 42, to the supporting shaft 25 of the shutter disc 24 and to a driving sprocket 43 for the film 10.

The portion of the transmitter thus far described is, except for the coding means 26, a conventional film scanning television transmitter employing a low-velocity image-storing video-frequency signal generator. The operation of such a transmitter is well understood in the art. Briefly, the scanning signals from the line- and field-scanning generators 31, 32 cause the electron beam produced within tube 11 to be deflected across the mosaic 12 in two mutually perpendicular scanning directions. In conventional television practice, the line-scanning direction is usually horizotal while the field-scanning direction is vertical so that the scanning signals from the generators 31, 32 control the electron beam to scan the mosaic in a series of fields of parallel lines. In each field-scanning cycle, there is a field-trace period when the beam traverses the mosaic in the field direction at a relatively slow rate and a field-retrace period during which the beam rapidly traverses the field in the opposite direction. In any such scanning cycle, an image stored on the mosaic 12 gives rise to video-frequency signal potentials across the resistor 13. These potentials, after amplification in the video-frequency amplifier 34, are combined in the mixer amplifier 33 with line- and field-synchronizing components from the generator 30, thereby to define a composite television signal. The composite signal, after further amplification as desired, is modulated on a carrier-frequency signal in the transmitter 35 and is radiated to subscriber receivers from the antenna system 36, 37.

The driving mechanism 40 controls the rotation of the shutter disc 24 and the travel of the film 10 through the film gate 22. This driving mechanism is synchronized by vertical-synchronizing signals supplied thereto from the synchronizing-signal generator because it is necessary to correlate the driving action with respect to the field-scanning frequency. Although the film drive may be continuous or intermittent, it will be assumed for the purpose of this description, that an intermittent drive is employed and that the phasing of the shutter disc 24 is so selected that the optical path to the mosaic 12 is completed only during field-retrace intervals of the scanning beam in the tube 11. During each field-retrace period, shutter 24 opens and permits the image of a film frame to be focussed upon the mosaic to store therein an image corresponding to the film frame which is within the film gate 22 at that moment. A block-out potential may, of course, bias tube 11 to cut off throughout the field retrace although this feature has been omitted in an effort to simplify the drawings. At the start of the next field-trace interval, the shutter closes the optical path and the stored image is scanned to derive the video-frequency information, as previously explained. During the field-trace period the optical path is effectively blocked and the driving mechanism 40 is permitted to advance the film and introduce the next succeeding frame into the film gate. In this fashion, succeeding frames of the film are scanned to transmit the information recorded on the film to subscriber receivers. In conventional practice, the scanning of the mosaic is in accordance with double interlaced methods although sequential scanning may also be utilized if desired.

To practice subscription type transmission, it is necessary to have the composite television signal coded so that only receivers that have subscribed to the service are able to utilize the radiated signal to synthesize intelligible pictures. For this purpose, the optical system includes the previously mentioned coding means 26 for changing the mode of film images presented to the mosaic 12. The coding means 26, for the embodiment of the invention under consideration, is a transparent refractive plate pivotally supported across the optical path extending from the film gate 22 to the mosaic 12. As represented in the fragmentary view of Fig. 2, the plate 26 is pivotally supported on a vertical pivot axis 50 which is parallel to the field-scanning direction. A spring 51 urges the plate against a stop 52, positioning the plate in a plane normal to the optical path. The plate is also mechanically coupled to the armature of a relay 53, as indicated by the broken construction line 54, so that upon energization of the relay the plate may pivot on its axis 50 and be moved against a second stop 55, positioning the plate obliquely across the optical path, as indicated in Fig. 3, to displace the position of a frame image in the line-scanning or horizontal direction with respect to the mosaic 12 or image area of the tube 11. The relay 53 provides means for actuating or moving the coding plate 26 to vary, during spaced operating intervals, the mode of frame images presented to the mosaic 12.

It is preferable that any movement of the coding plate 26 take place during that part of a scanning cycle of the generator 11 in which images are effectively blocked from the scanning means comprising the electrode system and its associated deflecting elements. In most video-frequency signal generators, there is no video-frequency output obtained during the field-retrace intervals and thus it is possible to actuate the coding plate during such intervals. However, in a film scanner of the type under consideration, the mosaic is subjected to the influence of the image of a film frame during the field-retrace intervals so that in such a case it is inappropriate to shift the coding plate during field retrace. But, since the shutter disc 24 blocks the optical path to the mosaic during the field-trace times, movement of the plate 26 may be effected while the field trace is being accomplished. That, of course, has the advantage of providing a much longer period of time (approximately a complete field-trace interval) in which to shift the coding plate from one of its limiting positions determined by the stop 52 to the alternate position determined by the other stop 55. The transmitter has a timing network which controls the energization of the relay 53 to actuate the coding plate 26 during such trace intervals. This timing network also governs the program or schedule in accordance with which the plate 26 is actuated to determine the coding schedule of the transmitted and coded composite television signal.

The timing arrangement referred to, preferably, establishes a random coding schedule because a random schedule assures optimum privacy for the system. To that end, a random-frequency divider 60 is coupled to the field-synchronizing output terminal of the generator 30 to divide the field-synchronizing signals in a random manner. Such a frequency divider is described and claimed in copending application of Erwin M. Roschke, Serial Number 32,457, filed June 11, 1948, and assigned to the same assignee as the present invention. The output circuit of the random-frequency divider is coupled to the input or control circuit of a single-shot multivibrator 61, that is, a multivibrator or trigger circuit in which one applied control impulse conditions the unit in one sense whereas the next succeeding pulse conditions the unit in the opposite sense, thereby to produce at the output terminals a signal of a rectangular wave form in which the amplitude changes between maximum and minimum levels occur in accordance with the controlling pulses supplied by the frequency divider 60. The output signal of the multivibrator, which will be referred to as a control signal, is applied through a condenser 62 to the input terminals of a time-delay network and amplifier 63. Since the amplitude variations of the control signal occur in substantially time coincidence with the divided field-synchronizing pulses, the time delay exhibited by unit 63 is selected so that the output therefrom occurs after the field-retrace period represented by any output pulse from unit 61. In view of this time relationship, the relay 53, which is coupled to the output circuit of unit 63, is energized at, or shortly after, the start of a field-trace period of the generator 11.

To permit a subscriber receiver to utilize the coded television transmission, a second channel, shown as a line circuit 65, extends from the transmitter and may be connected through any suitable distribution system, such as a telephone line, to the subscriber receiver. A key-signal generator 66 is provided, having output terminals coupled to the line circuit 65. Where the line circuit is a component of a telephone system, the key-signal generator may be an oscillator that is super-audible yet of a frequency sufficiently low for transmission over the line circuit.

The transmitter further includes means for controlling the key-signal generator to produce a key signal having characteristic variations representing the coding schedule of the transmitter, that is, representing the times in which there is a change in mode of the frame images presented to the mosaic 12 of the generator 11. It is convenient to use amplitude variations of the key signal to represent the coding schedule and they may be obtained by controlling the on and off conditions of the generator. That control is also established by the control signal obtained from the multivibrator 61 and supplied to the input circuit of the key-signal generator through a condenser 67. The control signal thus applied to the unit 63 and to the key-signal generator 66 is centered about its alternating-current axis and exhibits portions of positive and negative polarity. It is convenient in operating the system to have the positive-polarity portions of the control signal energize the relay 53 and turn the key-signal generator on, while negative-polarity portions of the control signal effectively de-energize the relay 53 and turn the key-signal generator off.

Figure 2:
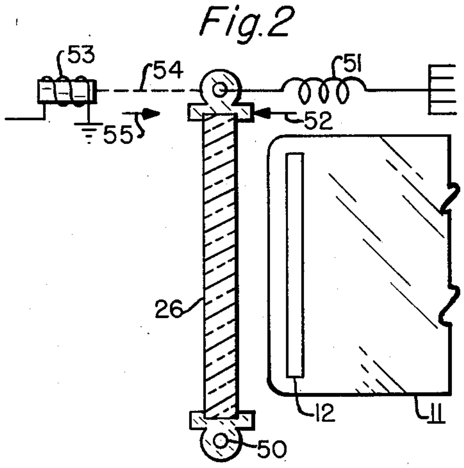
Fig. 2 represents a further view of an optical coding element included in the transmitter of Fig. 1.
Figure 3:
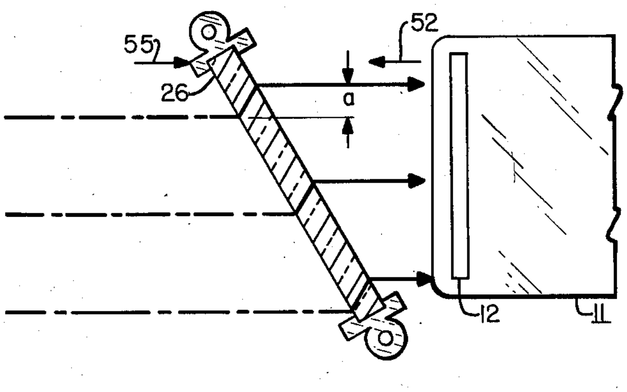
Fig. 3 is a view used to further an understanding of the operation of the optical coding element.

To understand the coding accomplished by the actuation of the refractory plate 26, reference is made to the fragmentary views of Figs. 2 and 3. During any operating interval in which the relay 53 is de-energized, the spring 51 retains the plate 26 in a position essentially normal to the optical path of the mosaic 12, as indicated in Fig. 2. When the plate is in this position, it has no appreciable influence on images transmitted along the optical path from the film gate so that such images are received in one position on the mosaic or scanning area 12 of the video-frequency generator 11. This will be termed the "first image mode" because it corresponds to one position of frame images on the mosaic. With this mode of film-frame presentation to the mosaic, the film scanner operates in the manner previously described to derive video-frequency components obtained from the generator 11 in successive line-trace intervals in fixed time relation with respect to the line-synchronizing components produced by synchronizing-signal generator 30. Their relation for this mode may be the same as that employed in conventional television practice.

In any operating interval in which the relay 53 is energized, the plate 26 is moved obliquely across the optical path and rests against the stop 55, as indicated in Fig. 3. For this condition, light rays experience a refraction in the plate and are displaced in the line-scanning direction by an amount alpha which may be controlled by appropriate choice of the refractive index of the plate. This displacement of the light rays causes a corresponding displacement of the position of the frame image on the mosaic 12 and will be considered as establishing a second mode of image presentation to the mosaic. In the second mode, a given point on any line of the frame image is scanned by the electron beam of the tube 11 at a later time in the line-trace interval than in the first mode because of the displacement of the frame image in the line-scanning direction on the mosaic. Consequently, the time relation of the program video-frequency components of any line-trace interval is modified with respect to the line-synchronizing components produced in the generator 30. Inasmuch as conventional television practice pre-supposes an invariable time relation between the video-frequency components of any line and the line-synchronizing components, variations of this time relation from time to time accomplishes coding of the composite television signal obtained from the mixer amplifier 33. In other words, the coding plate 26, when shifted between its limiting positions, is effective to vary the position of frame images in the mosaic and may be considered as effective to vary the mode in which frame images are presented to the mosaic. The change in mode is manifested by a change in the time relation of the program video-frequency components and the line-scanning components of the composite television signal which, therefore, is coded.

The random-frequency divider 60 produces in its output circuit pulses that occur in time coincidence with randomly selected ones of the field-synchronizing components supplied by generator 30. The random nature of the pulse output from the divider 60 determines the amplitude variations of the control signal produced by the multivibrator 61. Each positive portion of the control signal, centered about its alternating-current axis, energizes the relay 53 and concurrently turns on the key signal generator 66 whereas the negative-polarity portions thereof de-energize the relay and turn off the key-signal generator. This joint control of the relay 53 and the key-signal generator results in the application to the line circuit 65 of a key signal representing intervals in which the mode of frame-image presentation to the mosaic 12 is varied and also represents the coding schedule of the transmitted television signal because the coding schedule corresponds precisely with the changes in mode of the frame images.

One particular advantage of the described system resides in the fact that the relay 53 has almost an entire field-trace period in which to actuate the coding plate 26 and its actuation always occurs when the optical path to the generator 11 is blocked so that there is no interference with the operation of the generator in deriving accurate video-frequency signals. Moreover, the key-signal generator 66 has approximately a complete field-trace interval in which to build up to maximum amplitude because it is turned on before the tube 11 scans a field which represents a change in mode of the frame-image presentation. This build up time provided for the key-signal generator is desirable because it permits the system to operate satisfactorily even though there may be an inherent delay in the transmission of the key signal over the line circuit 65 to a subscriber receiver.

Receivers for utilizing subscription television signals of the type transmitted by the arrangement represented in Fig. 1 include compensating coding devices to modify the operation of the receiver effectively to decode the received television signal. Their coding arrangements are usually actuated by coincidence between the key signal received over the line circuit and a vertical synchronizing pulse obtained from the received television signal. This coincidence appropriately and accurately times the actuation of the decoding equipment of the receiver even though there may be some delay in the transmission of the key signal over the line circuit since the key signal is applied to the line circuit in advance of the response of generator 11 to a change in the mode of frame-image presentation.

Figure 4:
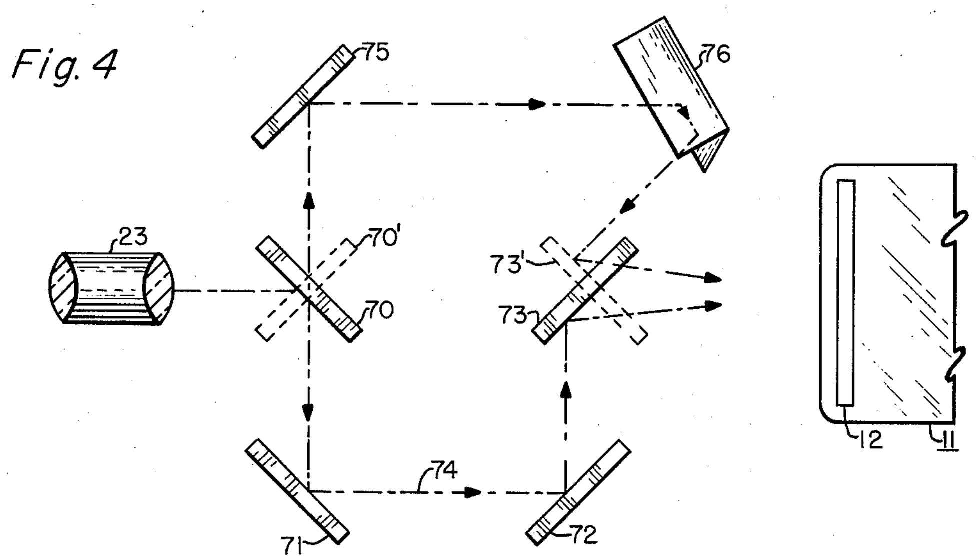
Fig. 4 and Fig. 5 individually represent modified forms of an optical system that may be utilized in the transmitter of Fig. 1 to effect subscription television transmission.

As already indicated, the invention is not limited to changing the mode of film-frame presentation by displacing the frame image, from time to time, with respect to the area of the mosaic 12 of the tube 11. If desired, the changes of mode may take the form of an inversion of the film frame either from top to bottom or from right to left and this type of coding may be accomplished by utilizing the optical system represented schematically in Fig. 4 in place of the coding refractory disc 26 in the transmitter of Fig. 1. Otherwise, the transmitter is as described and, of course, includes the flashing shutter 24, the film gate, and the related electrical components which have been omitted in order to simplify the representation of the optical arrangement of Fig. 4. That arrangement shows the projecting lens system 23 and a portion of the video-frequency signal generator 11. Between the lens and the generator there is an optical system including elements providing a first optical path for presenting images of successive film frames to the generator 11 and other elements providing a second optical path for presenting to the generator images of film frames inverted with respect to those images arriving at the mosaic 12 by way of the first-mentioned path. More specifically, the first path may be completed by a series of reflecting mirrors 70–73, inclusive, and the path thus defined is indicated by the dash-dot line 74. The alternate path includes mirrors 70 and 73 in common with the first path and additional mirrors 75 and 76, the latter taking the form of a pair of planar mirrors joined at right-angles.

The last-described path is completed when the mirrors 70 and 73, which are displaceable, assume the broken-line positions designated 70′ and 73′. These displaceable mirrors may be considered to constitute coding means in the optical system for completing, in alternation and in accordance with a desired coding schedule, first the one and then the other of the optical paths. The displacement of these mirrors may be accomplished by a mechanical coupling to the relay 53 of Fig. 1 or through any of a variety of well understood mechanical actuating systems. It is preferred, however, that the actuation of the mirrors between their limiting positions take place in absolute synchronism and phase and in accordance with a random coding schedule determined conveniently by the control signal obtained from the multivibrator 61 of Fig. 1 under the influence of the random-frequency divider 60.

Since the path including the compound mirror 76 causes an image to experience an additional reflection over and above that of the alternate path, the images from the one path are inverted with respect to those from the other and, assuming the representation to be in a vertical plane, the image inversion is in a plane perpendicular to the plane of the drawing. In other words, the inversion is in the line-scanning direction or is an inversion of the image from side to side. This system may also accomplish inversion of images in the field-scanning direction, that is, inversions from top to bottom. To accomplish that result, it is only necessary to rotate the entire group of elements 71–76 of the optical system 90° with respect to the axis of the system.

Figure 5:
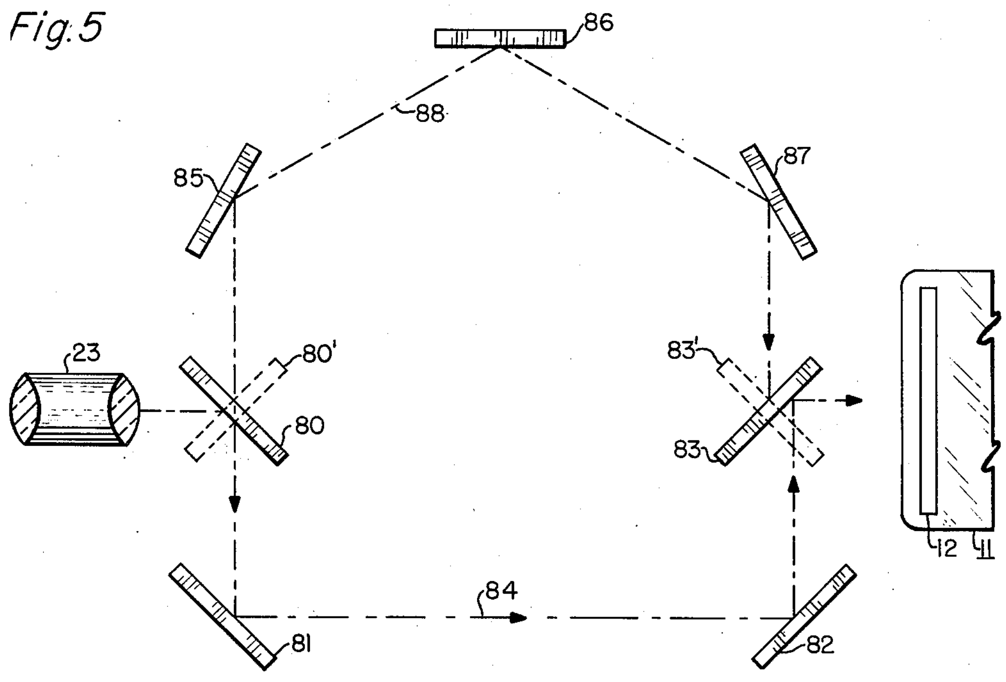

Another arrangement for effecting top-to-bottom inversion is represented in Fig. 5. This optical system again provides two paths from the lens 23 to the generator 11, the first including the displaceable mirror 80, fixed mirrors 81 and 82 and a second displaceable mirror 83. These elements define the path shown by the dash-dot line 84. The alternate path is completed when the mirrors 80 and 83 are moved to the positions indicated 80′ and 83′. Included in this alternate path are mirrors 85, 86 and 87 and the path provided thereby is designated 88. The use of simple planar mirrors in the system of Fig. 5 introduces an inversion of the images transmitted by the path 88 with respect to those transmitted by the path 84. The inversion is in the plane of the paper or in the field-scanning direction. Consequently, it is a top-to-bottom inversion. Obviously, the mirrors 81 and 82 may be incorporated into a single prism having a generally trapezoidal shape and likewise the mirrors 85, 86 and 87 may be integrated into an optical prism. In any such case, the prism should exhibit total internal reflecting properties.

In the described modifications of the invention, subscription television transmission is accomplished even though the electrical components of the transmitter function in their normal way and even though the video-frequency information is derived from the scanning of a conventional film strip. The privacy or coding required for effective and practical subscription transmission results from the use of optical systems operated in unusual ways to modify, from time to time, the mode of image presentation to the film scanner. The optical systems employed are inexpensive and sufficient operating time is provided to enable the displaceable elements thereof to be actuated when it is desired to effect a change in the mode of frame-image presentation.

While there have been shown and described specific embodiments of the present invention, it will be obvious that modifications may be made without departing therefrom. The appended claims are intended to cover any such modifications as fall within the true spirit and scope of the invention.

I claim:

1. A subscription type television transmitter for deriving coded television signals from a film strip on which program information is recorded in the same mode in succeeding frames comprising: a video-frequency signal generator including means for scanning an image; an optical system for presenting images of successive frames of said film to said scanning means and including coding means for changing the mode of images presented to said scanning means; means for actuating said coding means to vary, during spaced operating intervals, the modes of images presented to said scanning means; a synchronizing-signal generator for producing synchronizing signals representing the scanning cycles of said scanning means; a mixer amplifier coupled to said generators for developing a coded composite television signal including video-frequency and synchronizing-signal components; means for transmitting said composite signal to subscriber receivers over a first signal channel; a key-signal generator; means for controlling said key-signal generator to produce a key signal having characteristic variations representing the changes in mode of images presented to said scanning means; and means for supplying said key signal to a second channel for transmission to subscriber receivers.

2. A subscription type television transmitter for deriving coded television signals from a film strip on which program information is recorded in the same mode in succeeding frames comprising: a video-frequency signal generator including means for cyclically scanning an image and having in each scanning cycle a period in which images are effectively blocked from said scanning means; an optical system for presenting images of successive frames of said film to said scanning means and including coding means for changing the mode of images presented to said scanning means; means for actuating said coding means to vary, during spaced operating intervals, the modes of images presented to said scanning means; means for timing the actuation of said coding means to effect a change in the image mode only during the aforesaid period of said scanning cycles; a synchronizing-signal generator for producing synchronizing signals representing the scanning cycles of said scanning means; a mixer amplifier coupled to said generators for developing a coded composite television signal including video-frequency and synchronizing-signal components; means for transmitting said composite signal to subscriber receivers over a first signal channel; a key-signal generator; means for controlling said key-signal generator to produce a key signal having characteristic variations representing the changes in mode of images presented to said scanning means; and means for supplying said key signal to a second channel for transmission to subscriber receivers.

3. A subscription type television transmitter for deriving coded television signals from a film strip on which program information is recorded in the same mode in succeeding frames comprising: a video-frequency signal generator of the image-storage type including means for scanning an image and having field-trace and field-retrace periods; an optical system for presenting, only during said retrace periods, images of successive frames of said film to said scanning means and including coding means for changing the mode of images presented to said scanning means; means for actuating said coding means to vary, during spaced operating intervals, the modes of images presented to said scanning means; means for timing the actuation of said coding means to effect a change in the image mode only during said trace periods; a synchronizing-signal generator for producing synchronizing signals representnig the scanning cycles of said scanning means; a mixer amplifier coupled to said generators for developing a coded composite television signal including video-frequency and synchronizing-signal components; means for transmitting said composite signal to subscriber receivers over a first signal channel; a key-signal generator; means for controlling said key-signal generator to produce a key signal having characteristic variations representing the changes in mode of images presented to said scanning means; and means for supplying said key signal to a second channel for transmission to subscriber receivers.

4. A subscription type television transmitter for deriving coded television signals from a film strip on which program information is recorded in the same mode in succeeding frames comprising: a video-frequency signal generator including means for scanning an image and having field-trace and field-retrace periods; an optical system for presenting images of successive frames of said film to said scanning means and including coding means for changing the mode of images presented to said scanning means; means for actuating said coding means to vary the modes of images presented to said scanning means; a synchronizing-signal generator for producing field-synchronizing signals representing the scanning cycles of said scanning means; a timing network coupled to said synchronizing-signal generator for deriving a control signal in response to said field-synchronizing signals; means for applying said control signal to said actuating means to determine the operating intervals thereof; a mixer amplifier coupled to said generators for developing a coded composite television signal including video-frequency and synchronizing-signal components; means for transmitting said composite signal to subscriber receivers over a first signal channel; a key-signal generator; means for applying said control signal to said key-signal generator to produce a key signal having characteristic variations representing the changes in mode of images presented to said scanning means; and means for supplying said key signal to a second channel for transmission to subscriber receivers.

5. A subscription type television transmitter for deriving coded television signals from a film strip on which program information is recorded in the same mode in succeeding frames comprising: a video-frequency signal generator including means for scanning an image area; an optical system providing an optical path for focusing images of successive frames of said film on said image area and including a coding element movable with respect to said path to displace the position of a frame image on said image area; means for moving said coding element to vary, during spaced operating intervals, the position of frame images on said image area; a synchronizing-signal generator for producing synchronizing signals representing the scanning cycles of said scanning means; a mixer amplifier coupled to said generators for developing a coded composite television signal including video-frequency and synchronizing-signal components; means for transmitting said composite signal to subscriber receivers over a first signal channel; a key-signal generator; means for controlling said key-signal generator to produce a key signal having characteristic variations representing operating intervals in which the position of frame images is displaced on said image area; and means for supplying said key signal to a second channel for transmission to subscriber receivers.

6. A subscription type television transmitter for deriving coded television signals from a film strip on which program information is recorded in the same mode in succeeding frames comprising: a video-frequency signal generator including means for scanning an image area in a series of fields of parallel lines; an optical system providing an optical path for focusing images of successive frames of said film on said image area and including a transparent refractive coding element pivotally supported across said path on an axis parallel to the field-scan direction and movable with respect thereto to displace the position of a frame image in the line-scan direction on said image area; means for moving said coding element to vary, during spaced operating intervals, the position of frame images on said image area; a synchronizing-signal generator for producing synchronizing signals representing the scanning cycles of said scanning means; a mixer amplifier coupled to said generators for developing a coded composite television signal including video-frequency and synchronizing-signal components; means for transmitting said composite signal to subscriber receivers over a first signal channel; a key-signal generator; means for controlling said key-signal generator to produce a key signal having characteristic variations representing operating intervals in which the position of frame images is displaced on said image area; and means for supplying said key signal to a second channel for transmission to subscriber receivers.

7. A subscription type television transmitter for deriving coded television signals from a film strip on which program information is recorded in the same mode in succeeding frames comprising: a video-frequency signal generator including means for scanning an image; an optical system for presenting images of successive frames of said film to said scanning means and including coding means for inverting the images presented to said scanning means; means for actuating said coding means to invert, during spaced operating intervals, the images presented to said scanning means; a synchronizing-signal generator for producing synchronizing signals representing the scanning cycles of said scanning means; a mixer amplifier coupled to said generators for developing a coded composite television signal including video-frequency and synchronizing-signal components; means for transmitting said composite signal to subscriber receivers over a first signal channel; a key-signal generator; means for controlling said key-signal generator to produce a key signal having characteristic variations representing the inversion of images presented to said scanning means; and means for supplying said key signal to a second channel for transmission to subscriber receivers.

8. A subscription type television transmitter for deriving coded television signals from a film strip on which program information is recorded in the same mode in succeeding frames comprising: a video-frequency signal generator including means for scanning an image; an optical system including elements providing a first optical path for presenting images of successive film frames to said scanning means and including elements providing a second optical path for presenting to said scanning means images of successive film frames inverted with respect to images presented to said scanning means over said first path; coding means included in said optical system for completing, in alternation and in accordance with a prescribed coding schedule, said first and second paths; a synchronizing-signal generator for producing synchronizing signals representing the scanning cycles of said scanning means; a mixer amplifier coupled to said generators for developing a coded composite television signal including video-frequency and synchronizing-signal components; means for transmitting said composite signal to subscriber receivers over a first signal channel; a key-signal generator; means for controlling said key-signal generator to produce a key signal having characteristic variations representing the coding schedule of said coding means; and means for supplying said key signal to a second channel for transmission to subscriber receivers.

ALEXANDER ELLETT.

REFERENCES CITED

The following references are of record in the file of this patent:

UNITED STATES PATENTS

| Number | Name | Date |
|---|---|---|
| 1,979,296 | Sweeney | Nov. 6, 1934 |
| 2,291,723 | Jensen | Aug. 4, 1942 |
| 2,404,839 | Hammond | July 30, 1946 |
| 2,472,774 | Mayle | June 7, 1949 |